United States Patent
Coffin et al.

(10) Patent No.: US 7,028,314 B2
(45) Date of Patent: Apr. 11, 2006

(54) MEDIA STORAGE SYSTEM AND METHOD FOR IDENTIFYING A STORAGE LOCATION THEREIN

(75) Inventors: Paul C. Coffin, Battle Ground, WA (US); Gregg S. Schmidtke, Fort Collins, CO (US); Duane L. Harmon, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 296 days.

(21) Appl. No.: 10/396,011

(22) Filed: Mar. 24, 2003

(65) Prior Publication Data

US 2004/0190396 A1   Sep. 30, 2004

(51) Int. Cl.
G11B 17/04   (2006.01)

(52) U.S. Cl. ..................................... 720/606

(58) Field of Classification Search ............... 720/606, 720/615, 631, 605; 369/30.3–30.43, 30.03; 711/113, 114; 414/277, 279
See application file for complete search history.

(56) References Cited

U.S. PATENT DOCUMENTS

| | | | | |
|---|---|---|---|---|
| 5,303,214 A * | 4/1994 | Kulakowski et al. ...... 369/30.3 |
| 5,724,321 A * | 3/1998 | Vishlitzky ................. 369/30.3 |
| 5,729,464 A * | 3/1998 | Dimitri ....................... 700/215 |
| 5,781,367 A * | 7/1998 | Searle et al. ................. 360/92 |
| 5,933,396 A * | 8/1999 | Hammar et al. ......... 369/30.43 |
| 5,975,674 A   | 11/1999 | Beauchamp et al. |
| 5,999,356 A * | 12/1999 | Dimitri et al. ................ 360/71 |
| 6,185,165 B1* | 2/2001 | Jesionowski et al. .... 369/30.34 |
| 6,205,093 B1* | 3/2001 | Abbott et al. ............ 369/30.31 |
| 6,216,057 B1* | 4/2001 | Jesionowski ................ 700/214 |
| 6,240,058 B1  | 5/2001 | Pitz et al. |
| 6,246,642 B1* | 6/2001 | Gardner et al. .......... 369/30.42 |
| 6,409,450 B1  | 6/2002 | Ostwald et al. |
| 6,499,928 B1  | 12/2002 | Ostwald et al. |
| 6,618,348 B1* | 9/2003 | Coffin et al. ........... 369/178.01 |
| 6,669,430 B1  | 12/2003 | Ostwald et al. |
| 6,710,962 B1* | 3/2004 | Caverly et al. ............... 360/69 |
| 6,820,273 B1* | 11/2004 | Gardner et al. ............. 720/632 |
| 2004/0013051 A1* | 1/2004 | Ballard et al. ........... 369/30.03 |
| 2004/0096301 A1* | 5/2004 | Ostwald et al. ............. 414/277 |

* cited by examiner

Primary Examiner—Allen Cao

(57) ABSTRACT

Media storage system and method for identifying storage locations therein. One embodiment of the media storage system may comprise at least one storage library having a storage area therein. At least one access panel operatively associated with the at least one storage library, the at least one access panel opening to provide access to the storage area in the at least one storage library. A picker assembly mounted in the at least one storage library having at least one indicator mounted to the picker assembly. The at least one indicator identifying the at least one access panel when the at least one access panel is ready to open.

23 Claims, 3 Drawing Sheets

MEDIA STORAGE SYSTEM AND METHOD FOR IDENTIFYING A STORAGE LOCATION THEREIN

FIELD OF THE INVENTION

The invention generally pertains to media storage systems, and more specifically, to media storage systems and methods for identifying storage locations therein.

BACKGROUND OF THE INVENTION

Media storage systems, or autochangers, are commonly used to store data cartridges at known locations and to retrieve the desired data cartridges so that data may be written to and/or read from the data cartridges. Accordingly, large volumes of computer-readable data can be stored on numerous data cartridges and accessed by one or more computers connected to the storage system (e.g., over a network).

Such media storage systems may include one or more storage libraries stacked one on top of the other, although other arrangements are also possible. Each storage library may be configured with a number of storage locations for the data cartridges and at least one storage drawer for accessing the storage locations therein. The storage drawer can be opened by the user to add, remove, and/or rearrange data cartridges in the storage locations provided therein. The media storage system may also have one or more cartridge read/write devices that provide access to the data stored on the data cartridges. A picker assembly is operable in the media storage system to transport data cartridges between storage locations and between the read/write device and the storage locations.

A media storage system is typically provided with a controller that maintains an inventory so that the data cartridges stored in the media storage system can be readily identified and accessed during operation. To maintain the integrity of the inventory, the user cannot open the storage drawers during operation. Instead, the media storage system must be shut down before the storage drawers can be opened and data cartridges manually added, removed, or rearranged therein. Upon start-up, the controller must inventory the entire media storage system. This is a time-consuming procedure, and the media storage system cannot be used to access data during this time.

Some media storage systems are provided with a dedicated drawer or "mail slot" that can be opened during operation to add or remove data cartridges. The picker transports the data cartridges between the mail slot and the storage location, and therefore the integrity of the inventory is maintained during operation of the media storage system. However, the picker assembly cannot be used to access other data cartridges when it is transporting data cartridges between the mail slot and the storage location, and vice versa. In addition, when a data cartridge becomes jammed, the media storage system still needs to be shut down before the user can open other storage drawers and manually access the jammed data cartridge.

Alternatively, the media storage system may be provided with a messaging system. The messaging system may display a text description of one of the storage drawers that can be opened during operation. Once the user has added, removed, and/or rearranged the data cartridges in the designated storage drawer, the controller only needs to update the inventory for the storage drawer that was identified to the user to open. However, the storage drawer may be difficult for the user to identify based on the text description, and the user may inadvertently damage the storage drawer by attempting to open a locked storage drawer.

SUMMARY OF THE INVENTION

One embodiment of a media storage system may comprise at least one storage library having a storage area therein. At least one access panel operatively associated with the at least one storage library, the at least one access panel opening to provide access to the storage area in the at least one storage library. A picker assembly mounted in the at least one storage library. At least one indicator mounted to the picker assembly, the at least one indicator identifying the at least one access panel when the at least one access panel is ready to open.

A method for identifying a storage location in a media storage system to a user, comprising determining which of a plurality of access panels corresponds to the storage location, positioning a picker assembly adjacent an access panel corresponding to the determined storage location, and activating an indicator on the picker assembly when the picker assembly is adjacent the access panel corresponding to the storage location.

BRIEF DESCRIPTION OF THE DRAWINGS

Illustrative and presently preferred embodiments of the invention are shown in the drawings, in which.

DETAILED DESCRIPTION

Indicator 10 for use with media storage system 12 is shown and described herein according to embodiments of the invention. Briefly, media storage systems 12, such as the one shown in FIG. 1, may comprise one or more storage libraries 20–23 (referred to hereinafter generally by reference number 20 unless identifying a specific storage library).

Figure 1:
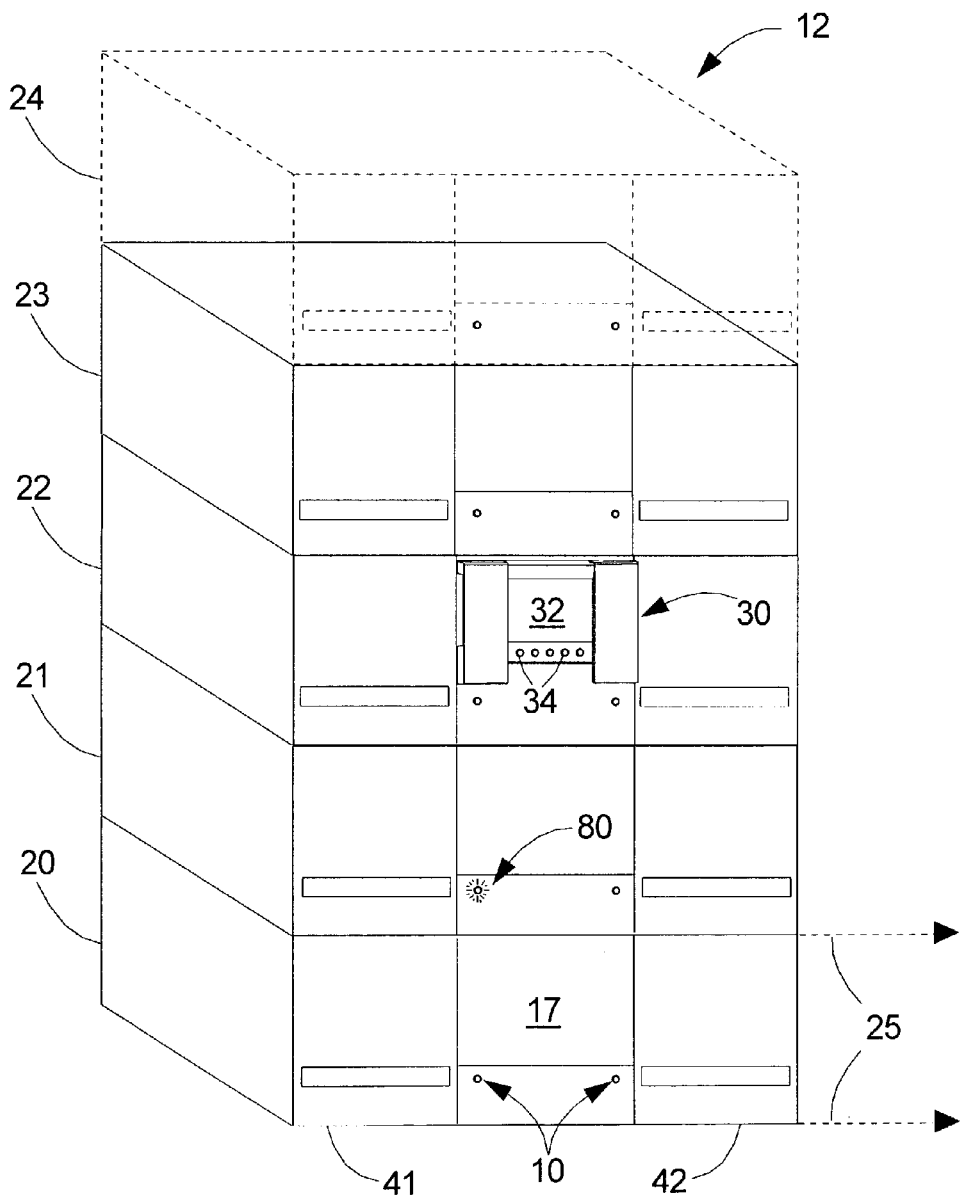
FIG. 1 is a perspective view of a media storage system having at least one indicator according to an embodiment of the invention.

The storage libraries 20 may be arranged adjacent one another, and additional storage libraries 20 may be added to the media storage system 12 to provide storage capacity for more data cartridges 14. Storage libraries 20 may comprise a front panel 17 and are commonly stacked one on top of the other, as shown in FIG. 1. Of course more storage libraries may also be stacked on the media storage system 12, as illustrated by storage library 24. Other arrangements are also possible. For example, storage libraries 20 may be stacked next to one another (on either side, in front, or behind), as illustrated by lines 25 in FIG. 1.

Media storage system 12 may also be provided with a control panel 30, shown in FIG. 1, for performing various administrative tasks, displaying status reports, etc. One embodiment of control panel 30 comprises a display 32 and keypad or individual keys 34. Control panel 30 may also be provided with, or operatively associated with other components, such as a processor, an identification device (e.g., a bar code reader), input/output (I/O) ports, etc. Alternatively, a host computer may be operatively associated with media storage system 12.

Figure 2:
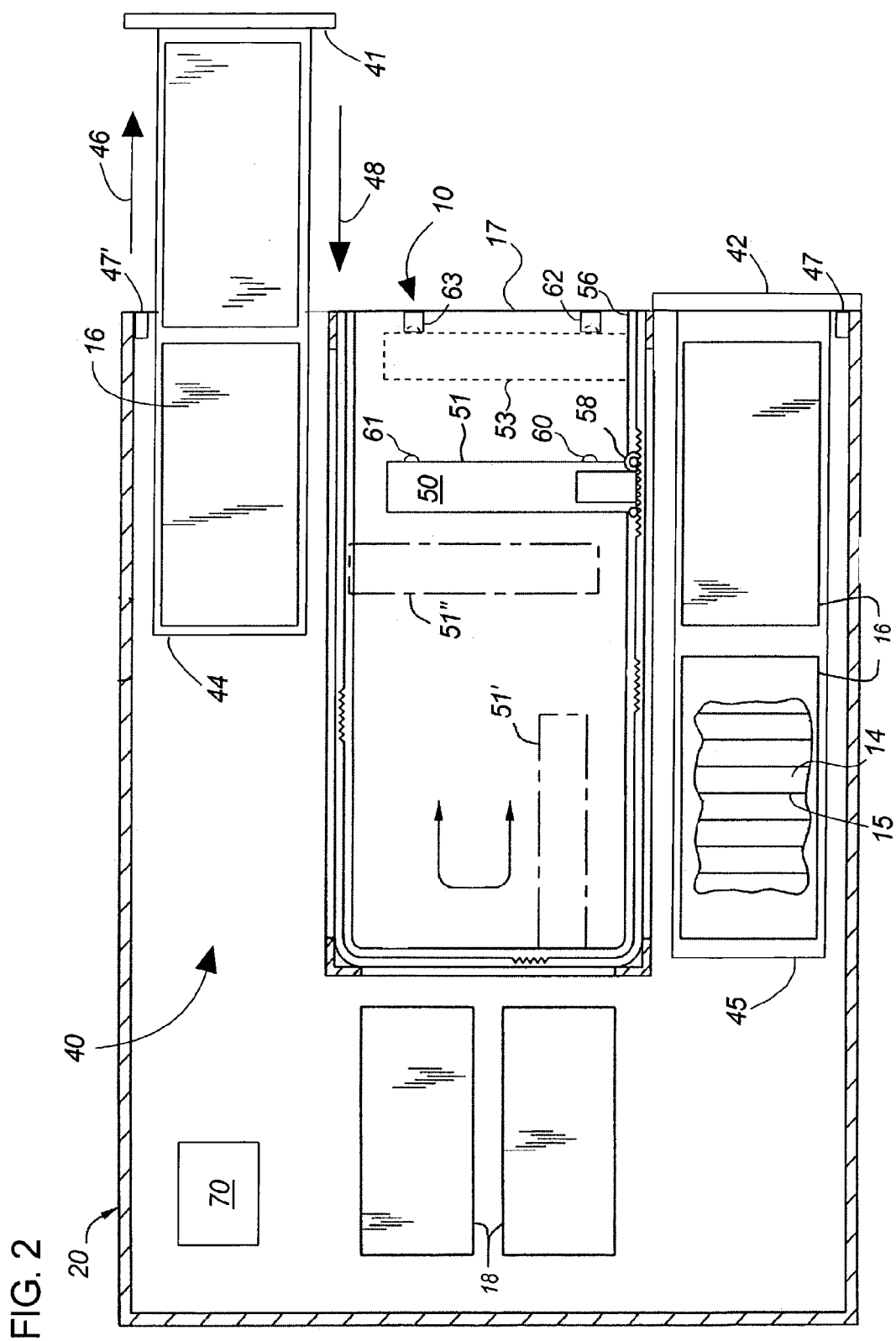
FIG. 2 is a plan view of one of the storage libraries of the media storage system shown in FIG. 1.

Storage library 20 may also comprise one or more access panels 41, 42 providing access to storage area 40, as shown in FIG. 2. Storage area 40 may have one or more storage drawers 44, 45. Read/write device(s) 18 may also be provided in storage area 40. Storage area 40 may be accessed by opening and closing storage drawer 44 in the directions illustrated by arrows 46 and 48, respectively. Of course it is understood that storage area 40 need not comprise storage drawers, and may be accessible through doors or any other suitable access panel.

Generally, the storage drawers 44, 45 comprise a number of storage locations for the data cartridges 14. For example, data cartridges 14 may be stored in removable storage magazines 16 which are divided into a number of slots 15 sized to retain data cartridges 14 therein.

It is noted that although the storage area 40 in storage library 20 is shown arranged in a particular configuration in FIG. 2, other suitable configurations are also contemplated as being within the scope of the invention. In addition, the number of storage magazines 16 and data-access devices 18 provided in each of the storage libraries 20 may depend upon various design considerations. Such considerations may include, but are not limited to, the frequency with which data is accessed, and the desired physical dimensions of storage library 20 and media storage system 12.

The storage drawers 44, 45 may be locked during operation of the media storage system 12, for example, by lock assembly 47. Preferably, lock assembly 47 keeps the storage drawers 44 locked during operation of the media storage system 12 to preserve the integrity of the inventory. Lock assembly 47 may be unlocked to allow access to the storage drawers 44, as illustrated by lock assembly 47'.

Media storage system 12 may also be provided with a picker assembly 50 (FIG. 2 and FIG. 3) for accessing the data cartridges 14 in storage area 40 during operation. Picker assembly 50 may comprise a housing 52 (FIG. 3) that defines a cavity or chamber 54 sized to receive data cartridge 14 therein.

According to one embodiment, picker assembly 50 may be operatively associated with a guide system 56 (FIG. 2). Guide system 56 defines a generally U-shaped displacement path in the storage library 20 adjacent storage magazines 16 and read/write device 18, although other embodiments are also possible. In one embodiment, the guide system 56 may comprise a positioning rail having a gear track mounted thereto. Picker assembly 50 engages the gear track and can be moved along the positioning rail. For example, the picker assembly 50 may comprise an actuator assembly 58 (FIG. 3) having a drive motor operatively associated with a gear assembly. The gear assembly engages the gear track on the guide system 56 for moving the picker assembly 50 in the storage library 20.

In any event, picker assembly 50 is operable to transport data cartridges 14 between the storage magazines 16 and the read/write device 18. For example, picker assembly 50 withdraws one of the data cartridges 14 from one of the slots 15 in storage magazine 16, transports the data cartridge 14 within the media storage system 12, and ejects the data cartridge 14 at its intended destination, such as the read/write device 18.

For purposes of illustration, the picker assembly 50 is shown in FIG. 2 in positions 51, 51', and 51". The picker assembly 50 is shown positioned adjacent the storage magazines 16 at positions 51 and 51", and is shown positioned adjacent the data-access device 18 at position 51'. Preferably, picker assembly 50 can also be operated to move between adjacent storage libraries (e.g., 20 through 23 in FIG. 1).

Picker assembly 50 is shown positioned adjacent the front panel 17 of storage library 20 at position 53. When so positioned, indicator 10 is activated to identify one or more of the storage drawers 44, 45 in the media storage system 12 according to one embodiment of the invention discussed in more detail below.

Of course other embodiments of the picker assembly 50 and guide system 56 are also contemplated as being within the scope of the invention and may be readily provided by one skilled in the art after having become familiar with the teachings of the present invention.

The foregoing description of the media storage system 12 is provided in order to better understand one environment in which indicator 10 of the present invention may be used. It should be understood that indicator 10 may also be used in conjunction with any of a wide range of other types and configurations of media storage systems, now known or that may be developed in the future.

Figure 3:
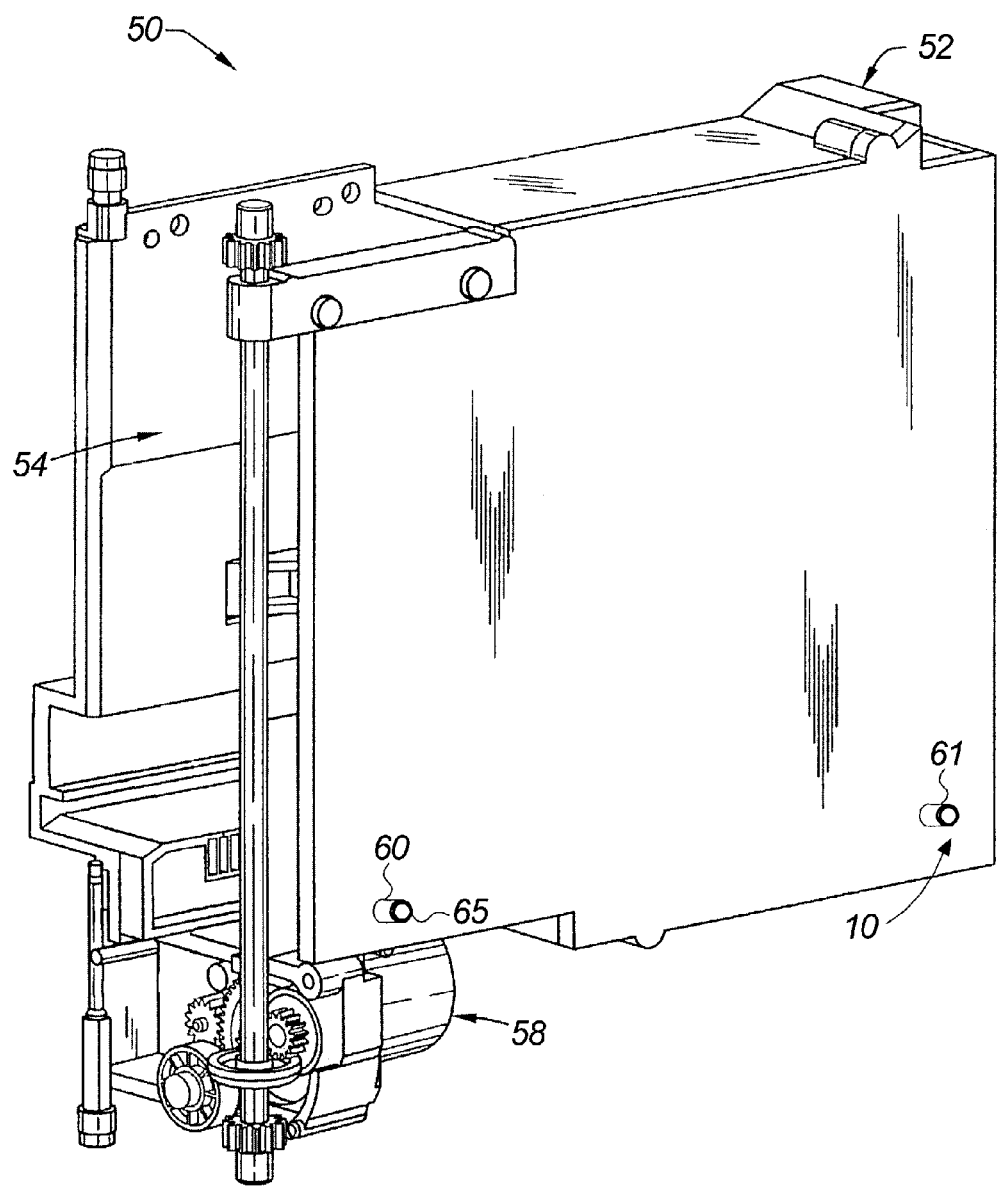
FIG. 3 is a perspective view of one embodiment of a picker assembly for use with the media storage system shown in FIG. 1, wherein the indicator is mounted to the picker assembly.

Indicator 10 is shown according to one embodiment of the invention mounted to picker assembly 50 in FIG. 3. Preferably, indicator 10 is mounted to a computer board provided with the picker assembly 50. As such, separate indicators need not be provided to identify each of the storage drawers 44, 45 in media storage system 12. Such a design reduces the occurrence of part failure and the associated expense of having to provide and maintain indicators 10 for each of the storage drawers 44, 45.

Also advantageously, indicator 10 mounted to picker assembly 50 may be configured to receive electrical power from the same source that provides electrical power to the picker assembly 50. Likewise, indicator 10 may also receive control signals (e.g., on, off, flash), for example, via the computer board provided with picker assembly 50. According to such embodiments, separate cabling need not be provided for indicator 10, reducing the costs and maintenance associated therewith.

Of course it is understood that although indicator 10 is shown and described herein as it may be used with a particular picker assembly 50, the invention is not limited to such an embodiment. Indeed, indicator 10 may be used with any of a wide range of other picker assemblies, now known or that may be developed in the future. In addition, the invention is not limited to use with indicator 10 mounted to the picker assembly 50.

In a preferred embodiment, indicator 10 comprises at least one light source 60, 61. For example, indicator 10 may be a light emitting diode (LED), incandescent light bulb, or fluorescent light, although any other suitable light source may also be used. Yet other embodiments are also contemplated as being within the scope of the invention. For example, indicator 10 may be a mechanical indicator or an audio indicator.

Also according to one embodiment, indicator 10 comprises light tubes 62, 63 (FIG. 2) formed on or otherwise mounted to the front panel 17 of storage library 20 adjacent each of the storage drawers 44, 45. Alternatively, light tubes 62, 63 may be mounted surrounding the light source 60, 61 on the picker assembly 50. Light tubes 62, 63 funnel or focus light emitted by the light source 60 in a predetermined direction. Light tubes 62, 63 also serve to reduce or altogether eliminate diffusion of the light inside of the storage library 20.

Light tube 62 may comprise a hollow cylinder mounted adjacent openings formed through the front panel 17 of storage library 20. Light tube 62 may be mounted to storage library 20 in such a manner that the light tube 62 directs light from light source 60 through the opening formed through front panel 17 of the storage library 20, so that the light is visible to the user. Accordingly, the light serves to identify one or more of the storage drawer(s) 44, 45 to the user. See for example, the identified access panel 80 in FIG. 1.

Light tube 62 is preferably manufactured from a plastic material, although any suitable material may be used. For example, light tube 62 may be fabricated, or coated with a reflective (e.g., white) material or a non-reflective (e.g., black) material. Likewise, light tube 62 may be manufactured to any suitable configuration, including any size and shape, and is not limited to a hollow cylinder. Preferably, light tube 62 is sized to align with the light source 60 when picker assembly 50 is positioned adjacent thereto, as it is shown in position 53 in FIG. 2.

Indicator 10 may further comprise an optional cover 65 provided over the opening in front panel 17. The cover is preferably transparent, and may be any suitable shape or color. For example, the cover may be a red arrow, which points toward storage drawer 44 or 45 when illuminated by light source 60. An optional lens may also be provided for focusing the light. Alternatively, the transparent cover may also serve as a lens, or vice versa.

Although indicator 10 has been shown and described herein according to exemplary embodiments of the invention, it is understood that yet other embodiments are also contemplated as being within the scope of the invention. In another embodiment, light source 60 may be mounted to either side of picker assembly 50 so that indicator 10 may be operated regardless of the orientation of the picker assembly 50 on guide system 56. In still another embodiment, indicator 10 may comprise electrical contacts mounted to picker assembly 50 and a light source 60 mounted to the front panel 17 of the media storage system 12. When the picker assembly 50 is moved to position 53 in the storage library 20 (FIG. 2), the contacts form an electrical link with the light source 60. Alternatively, transmitters (e.g., radio frequency (RF) transmitters) may be used to send an activation signal to the desired light source 60. Other embodiments will also occur to those skilled in the art after having become familiar with the teachings of the invention, and are considered to be well within the scope of the present invention.

Preferably, indicator 10 is operatively associated with a control system 70 (FIG. 2). In one embodiment, control system 70 comprises a processor and computer-readable storage operatively associated therewith. Although shown residing in one of the storage libraries 20, control system 70 may be arranged in any suitable manner. For example, control system 70 may be a host computer linked to media storage system 12 via a network.

Preferably, control system 70 maintains a "map" of the media storage system 12. According to one embodiment, the map is a computer-readable database stored on computer-readable storage media. Suitable program code for maintaining and reading the database may be provided as part of control system 70.

In one embodiment, the map identifies each of the storage locations in the media storage system 12 by an internal designation (e.g., SLOT 1, SLOT 2, etc.). The map also identifies the data cartridges 14 by corresponding high-level designations (e.g., CARTRIDGE A, CARTRIDGE B, etc.). The map may be accessed by the control system 70 to determine where a particular data cartridge 14 belongs in the media storage system 12 based on the high-level designation of the data cartridge 14.

The map enables the control system 70 to translate between the high-level designations for the data cartridges 14 that the user is accustomed to and can readily identify, and the internal designations used by the controller during operation of the media storage system 12 (e.g., for communications with the picker assembly 50). By way of illustration, when the user wants to add a data cartridge to the media storage system, the user need only provide the high-level designation for the data cartridge 14 to the control system 70. Based on the high-level designation, control system 70 uses the map to find a suitable storage location 15 for the data cartridge 14. Once found, indicator 10 identifies the storage location 15 to the user so that the user can add the data cartridge 14 to the media storage system 12.

Such high-level identification of the data cartridges 14 is preferred for the convenience of the user, but not required according to the teachings of the invention.

Indicator 10 may be used as follows according to one embodiment of the invention. Briefly, a user may want to add, remove, adjust and/or relocate at least one data cartridge 14 during operation of the media storage system 12. The control system 70 determines which storage area(s) 40 are to be accessed by the user, and an access panel for accessing the storage area 40 is identified to the user. The user may then access the storage area(s) 40 via the access panel(s) identified by indicator 10.

As an illustration, assume the user wants to add a data cartridge 14 to the media storage system 12. The data cartridge 14 may be provided to replace an older data cartridge already in use within the media storage system 12. Control system 70 determines which of the storage area(s) 40 is to be accessed by the user, and one or more of the access panels is identified to the user as being ready to open.

In one embodiment, the user may identify to the control system 70 the data cartridge 14 that is to be added to the media storage system 12. For example, the user may scan identifying indicia on the data cartridge 14 (e.g., a bar code label) or manually enter the same (e.g., via interface 30), thereby identifying the data cartridge 14 to the control system 70.

In any event, control system 70 finds a suitable storage location 15 for the data cartridge 14 in the media storage system 12. For example, control system 70 may use the map to locate a predetermined storage location 15 for the data cartridge 14 (e.g., based on the high-level designation scanned from the bar code label). Where the data cartridge 14 is replacing a data cartridge 14 already in use, the location for the new data cartridge is likely to be the same as that of the existing data cartridge. Alternatively, control system 70 may identify an empty storage location 15 in the media storage system 12 where the data cartridge 14 is new to the media storage system 12. For example, control system 70 may identify a storage location in the same storage library 20 as other data cartridges 14 storing similar data.

Of course it is understood that any suitable method may be used to find a storage location 15 for the data cartridge 14. Similar methodology is also applicable to locating an inoperable data cartridge 14 or one that has become jammed in the media storage system 12 so that the user may access it.

Once control system 70 has determined which storage area 40 the user can access during operation of the media storage system 12, indicator 10 identifies the corresponding access panel(s) to the user. According to one embodiment, picker assembly 50 is moved to the storage library 20 and moved along the positioning rail 56 adjacent the front panel 17 of the storage library 20. Light source 60 may be activated and emits light external to the storage library 20, identifying the corresponding access panel to the user (illustrated by light 80 in FIG. 1).

Where the access panels are locked, control system 70 preferably activates the lock assembly 47. For example, lock assembly 47 may be activated to unlock the storage drawer 44 corresponding to the storage location 15 where the data cartridge 14 is to be added.

In addition, control system 70 may also cause an image or text to be displayed for the user illustrating the storage area 40 and more specifically identifying the storage location 15. According to one embodiment, the description may be provided via interface 30. For example, the storage location 15 for data cartridge 14 may be shown or described by slot number on the display 32, wherein the slot number corresponds to one of the labels visible to the user on the storage magazine 16.

Once the user has accessed the storage area 40, the user may close the access panel and the inventory can be updated. The inventory does not need to be updated for the entire media storage system 12. Nor does the media storage system 12 have to be powered down for the user to access the storage area 40.

What is claimed is:

1. A media storage system, comprising:
at least one storage library having a storage area therein;
at least one access panel operatively associated with said at least one storage library, said at least one access panel opening to provide access to said storage area in said at least one storage library;
a picker assembly mounted in said at least one storage library; and
at least one indicator mounted to said picker assembly, said at least one indicator identifying said at least one access panel when said at least one access panel is ready to open.

2. The media storage system of claim 1, wherein said picker assembly is positionable with said indicator adjacent said at least one access panel.

3. The media storage system of claim 1, further comprising a control system operatively associated with said indicator, said control system determining when said at least one access panel is ready to open.

4. The media storage system of claim 3, wherein said control system activates said at least one indicator.

5. The media storage system of claim 1, further comprising a lock assembly operatively associated with said at least one access panel.

6. The media storage system of claim 5, wherein said lock assembly is unlocked when said at least one access panel is ready to open.

7. The media storage system of claim 1, wherein said indicator comprises a light source.

8. The media storage system of claim 7, wherein said indicator comprises a light pipe operatively associated with said light source.

9. The media storage system of claim 7, wherein said indicator comprises a cover operatively associated with said light source.

10. The media storage system of claim 1, further comprising an interface operatively associated with said at least one storage library, said interface identifying a storage location within said at least one storage library.

11. A method for identifying a storage location in a media storage system to a user, comprising:
determining which of a plurality of access panels corresponds to the storage location;
positioning a picker assembly adjacent an access panel corresponding to the determined storage location; and
activating an indicator on the picker assembly at least when the picker assembly is adjacent the access panel corresponding to the storage location so that the activated indicator identifies the storage location to the user.

12. The method of claim 11, further comprising unlocking the access panel corresponding to the storage location.

13. The method of claim 11, further comprising finding the storage location in the media storage system.

14. The method of claim 13, wherein finding the storage location is based on a high-level designation for a data cartridge.

15. The method of claim 11, further comprising describing the storage location via an interface.

16. A media storage system, comprising:
storage means for storing data cartridges therein;
data access means for accessing the data cartridges in the storage means;
control means for determining which of said storage means to access; and
indicator means for identifying said storage means when said storage means is ready to access, said indicator means connected to said data access means.

17. The media storage system of claim 16, wherein said data access means moves said indicator means adjacent said storage means.

18. The media storage system of claim 16, further comprising means for unlocking said storage means.

19. A media storage system, comprising:
a plurality of access panels on a storage library, any of the plurality of access panels opening to provide a user access to a media storage area within the storage library;
an automated picker assembly movable within the storage library adjacent at least one access panel that is ready to open; and
a light indicator mounted to the automated picker assembly, the light indicator lighting up to identify for the user external the media storage area the at least one access panel that is ready to open.

20. The media storage system of claim 19, further comprising a redundant indicator on the automated picker assembly.

21. The media storage system of claim 19, wherein the access panel is connected to a storage drawer in the media storage area.

22. The media storage system of claim 19, further comprising a lock assembly for locking and unlocking at least one access panel, the lock assembly locked by default to prevent user access to the media storage area, and the lock assembly automatically unlocked to allow user access to the media storage area if the at least one access panel is ready to open.

23. The media storage system of claim 19, further comprising a user interface operatively associated with said at least one storage library, the interface identifying for the user at least one storage location in the storage area corresponding to the at least one access panel that is ready to open.

* * * * *